No. 732,629.

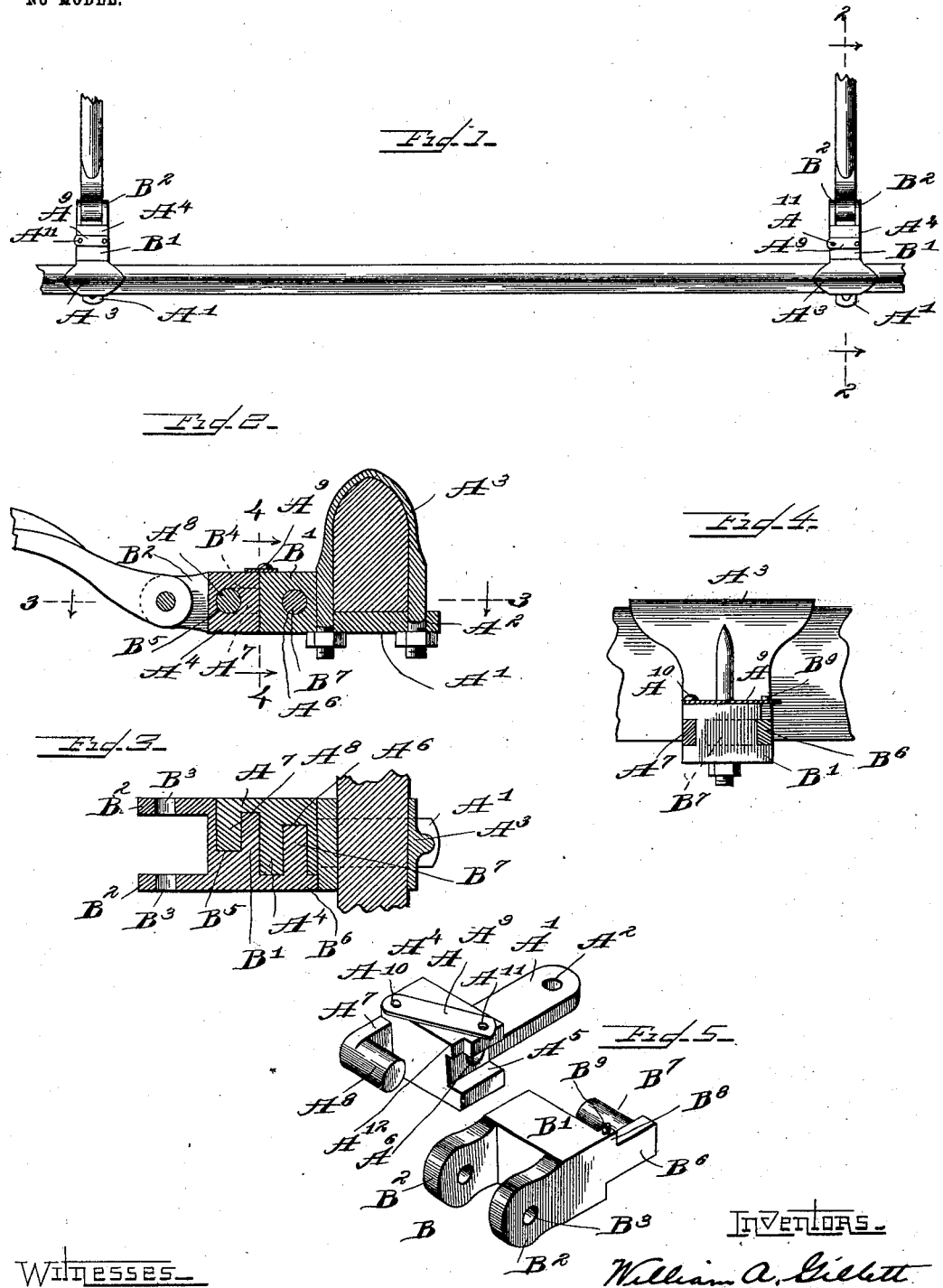

Patented June 30, 1903.

UNITED STATES PATENT OFFICE.

WILLIAM A. GILLETT, DAVID P. GILLETT, AND FREDERICK B. WOOD, OF WARRENS, WISCONSIN.

THILL OR POLE CLIP.

SPECIFICATION forming part of Letters Patent No. 732,629, dated June 30, 1903.

Application filed March 14, 1903. Serial No. 147,816. (No model.)

*To all whom it may concern:*

Be it known that we, WILLIAM A. GILLETT, DAVID P. GILLETT, and FREDERICK B. WOOD, citizens of the United States, residing at Warrens, in the county of Monroe and State of Wisconsin, have invented certain new and useful Improvements in Thill or Pole Clips, of which the following is a specification.

This invention refers to a separable thill and pole clip, and has for its object the production of a clip that is strong, certain in its action, easily separated for the removal of the thills or pole, and readily attachable to the ordinary axle.

A further object of the invention is the embodiment in a thill and pole clip of the various improvements in detail herein shown and described.

In the accompanying drawings, Figure 1 is a top plan view of a pair of clips in position on the axle of a vehicle. Fig. 2 is an enlarged sectional view through one of the clips and the axle on dotted line 2 2 of Fig. 1. Fig. 3 is a horizontal sectional view on dotted line 3 3 of Fig. 2. Fig. 4 is a view taken from the front side of the axle, showing one of the clips partially in section on the dotted line 4 4 of Fig. 3. Fig. 5 is an isometrical perspective view illustrating the two parts of one of the clips separated, as in the operation of uncoupling them.

In the application of the clip to thills or poles two of the clips are used, one for each thill or pole arm. The clip consists, essentially, of two members A and B, the former being intended to be fastened to the axle and the latter to the thill or pole arm. For attachment to the axle the member A is provided with the integral base-bar $A'$, having two holes $A^2$ properly spaced to receive the threaded shank ends of the well-known strap-iron $A^3$. The member A also has a body portion $A^4$, in one side of which is formed the longitudinal groove $A^5$, and opening from the bottom of this groove and extending transversely within said body portion is the opening $A^6$. From the side of the body portion opposite to that containing the groove $A^5$ an arm $A^7$ extends forwardly, said arm bearing at its forward end the transversely-extending stud $A^8$. On the upper face of the body portion $A^4$ a spring-locking latch $A^9$ is pivotally mounted upon the screw $A^{10}$, the free end of said latch being provided with an opening $A^{11}$, which is adapted to register with a notch $A^{12}$, cut from one of the upper forward corners of the body portion $A^4$.

The member B comprises a body portion $B'$, from the forward end of which and at the sides thereof two ears $B^2$ project, and these ears have the coinciding openings $B^3$ for the reception of a bolt for securing the member B to thill or pole arm in the usual manner.

One side of the body portion $B'$ is provided with a groove $B^4$, open at its rear end, and opening from its groove and extending transversely into said body portion $B'$ is a recess $B^5$, which groove and recess are adapted to receive the arm $A^7$ and its stud $A^8$, respectively. An arm $B^6$, having a transversely-extending stud $B^7$, is formed integral with and projects rearwardly from the rear face of the body portion $B'$, said arm and stud being intended to enter the groove $A^5$ and the opening $A^6$, respectively, in the body portion $A^4$ of the member A. At the point of juncture of the arm $B^6$ and the body portion $B'$ is formed a rectangular fillet $B^8$, adapted to coincide with the notch $A^{12}$ when the members A and B are placed together, and the upper end of this fillet has an upwardly-extending pin $B^9$ of suitable size to enter the opening $A^{11}$ in the free end of the spring-locking latch $A^9$, whereby the two members A and B are held securely together.

From the foregoing description it will be understood that each member A and B is provided with means for attachment to the axle and the thill or pole arm, respectively, and with an arm and a transversely-extending stud adapted to enter a corresponding groove and opening in the other member.

The two clips are identical, each with the other, and therefore it will be seen that when both members B of the pair are mounted in the rear end of a pair of thills or the rear end of a pole a bodily sidewise movement of the thills or pole will separate the two members of each clip, the locking-latch $A^9$ of each having previously been disengaged from its pin $B^9$.

The clips are applied to axle and thills or pole, as hereinbefore pointed out, and each pair of thills and each pole is provided with a pair of the members B, so that in changes in the vehicle from thills to pole, or vice versa, it will not be necessary to remove the members B from either thills or pole.

These clips are made of metal, preferably of malleable iron or cast-steel, and the parts are made close fitting, so that rattling is obviated. The joint between the two members of the clips is strong and rigid, no load being placed upon the locking-spring $A^9$, the latter is not subjected to wear.

The device herein illustrated and described is susceptible of many modifications in the form and arrangement of its parts without a departure from the spirit and scope of our invention. Therefore we do not limit ourselves to the particular construction herein set forth.

We claim as our invention—

1. In a thill and pole clip, in combination, a member provided with a longitudinally-extending arm and a transversely-extending opening, said arm having a transversely-extending stud; and a second member provided with a transversely-extending stud adapted to lie in the opening of said other member, also having an opening adapted to receive the stud on the arm of said other member.

2. In a thill and pole clip, in combination, a member having means for attaching it to the axle, said member being provided with an opening and a stud; and a second member having means for attaching it to the thill, said second member also having an opening adapted to receive the stud of the other member, and a stud adapted to lie in the opening of said other member.

3. In a thill and pole clip, in combination, a member having means for attaching it to the axle, said member being provided with an opening and a stud; a second member having means for attaching it to the thill, said second member also having an opening adapted to receive the stud of the other member, and a stud adapted to lie in the opening of said other member; and means for preventing the separation of said members.

4. In a thill and pole clip, in combination, a member having means for attaching it to the axle, said member being provided with an opening and a stud; a second member having means for attaching it to the thill, said second member also having an opening adapted to receive the stud of the other member, and a stud adapted to lie in the opening of said other member; and a locking-latch on said first-mentioned member, adapted to engage the second member.

WILLIAM A. GILLETT.
DAVID P. GILLETT.
FREDERICK B. WOOD.

Witnesses:
J. P. REINHARD,
H. BENTZER.